United States Patent
Safai

(10) Patent No.: US 9,260,174 B1
(45) Date of Patent: Feb. 16, 2016

(54) CRACK MITIGATION USING NANO-TUBE MESH

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 13/848,599

(22) Filed: Mar. 21, 2013

(51) Int. Cl.
  *B64C 1/12* (2006.01)
  *B64C 3/26* (2006.01)
  *B64D 45/02* (2006.01)

(52) U.S. Cl.
  CPC ... *B64C 1/12* (2013.01); *B64C 3/26* (2013.01); *B64D 45/02* (2013.01)

(58) Field of Classification Search
  CPC ............ B64C 1/066; B64C 1/12; B64C 3/26; B64D 45/02
  See application file for complete search history.

(56) References Cited

U.S. PATENT DOCUMENTS

| 2009/0194839 A1* | 8/2009 | Bertin et al. | 257/476 |
| 2010/0170994 A1* | 7/2010 | Burns et al. | 244/130 |
| 2012/0001150 A1* | 1/2012 | Schricker et al. | 257/9 |

OTHER PUBLICATIONS

Xavier Lepro et al., Catalytic Twist-Spun Yarns of Nitrogen-Doped Carbon Nanotubes, Advanced Functional Materials, 2012, pp. 1069-1075, vol. 22, wileyonlinelibrary.com.

* cited by examiner

*Primary Examiner* — Nicholas McFall
(74) *Attorney, Agent, or Firm* — Kunzler Law Group, PC

(57) ABSTRACT

An apparatus includes a first component that has a first coefficient of thermal expansion, a fastener that extends at least partially through the first component. The fastener has a second coefficient of thermal expansion that is different than the first coefficient of thermal expansion. The apparatus also includes a nano-tube mesh coupled to outer surfaces of the first component and fastener. Further, the apparatus includes a second component applied to the nano-tube mesh and outer surface of the first component. The nano-tube mesh may include carbon nano-tubes and/or nitrogen-doped carbon nano-tubes.

23 Claims, 5 Drawing Sheets

CRACK MITIGATION USING NANO-TUBE MESH

FIELD

This disclosure relates to mitigating cracks in a structure, and more particularly to mitigating cracks in a multi-component assembly using a nano-tube mesh between components of the assembly.

BACKGROUND

Many industries utilize advanced materials in the implementation of products and services. For example, the aerospace and automotive industries commonly use advanced materials made from composite fibers in view of its beneficial properties (e.g., high strength-to-weight ratio) over traditional materials.

However, notwithstanding the benefits, often such advanced materials are less conducive to certain applications where more traditional materials might be better suited. Accordingly, for many applications, traditional materials may be used in conjunction with advanced materials. For example, an aircraft may have a body made from composite fibers that is fastened to a frame using fasteners made from a more traditional material, such as steel.

Generally, components made from traditional materials are compatible for use with components made from advanced materials. However, in certain applications, the difference between the properties of traditional and advanced materials may introduce undesirable or unintended consequences. For example, some advanced materials, such as composite materials, have a much lower coefficient of thermal expansion than traditional materials, such as steel. When used together, the variance between the coefficients of thermal expansion of the component made from an advanced material and the component made from a traditional material may result in relative movement between the components as the components heat up and cool down.

Relative movement between components may be problematic when a component susceptible to cracks is coupled to both the moving components, particularly when the difference between the coefficients of thermal expansion is significant. As the components move relative to each other, the portion of the susceptible component coupled to one moving component tends to move with that component, while the portion of the susceptible component coupled to the other moving component tends to move with the other component. The relative movement of separate portions of the same component, when the component is susceptible to cracking, tends to result in the formation of cracks on or within the susceptible component at the boundary between moving portions. For example, in aircraft applications, cracks may form in the paint around a metal fastener that secures the composite body of an aircraft to a frame. Not only is cracking unsightly, but it can lead to more serious problems, such as structural degradation, aerodynamic flaws, and even catastrophic failure.

SUMMARY

The subject matter of the present application has been developed in response to the present state of the art, and in particular, in response to the problem of, and the need to mitigate, crack formation in components of various systems, such as aircraft, that have not yet been fully solved by currently available techniques. Accordingly, the subject matter of the present application has been developed to provide an apparatus, system, and method for mitigating the formation of cracks in multi-component systems, such as an aircraft, that overcome at least some of the above-discussed shortcomings of prior art techniques.

According to one embodiment, an apparatus includes a first component that has a first coefficient of thermal expansion, a fastener that extends at least partially through the first component. The fastener has a second coefficient of thermal expansion that is different than the first coefficient of thermal expansion. The apparatus also includes a nano-tube mesh coupled to outer surfaces of the first component and fastener. Further, the apparatus includes a second component applied to the nano-tube mesh and outer surface of the first component. The nano-tube mesh may include carbon nano-tubes and/or nitrogen-doped carbon nano-tubes.

In some implementations of the apparatus, the first component is made from a composite fiber material. The fastener can be made from a metal material. The second component can be made from an electrically insulating material. In certain implementations, the second component is made from at least one of a dielectric material or a paint material. According to some implementations, the second component is made from a dielectric material, and the apparatus further includes a third component applied to the second component, where the third component is made from a paint material.

In certain implementations, the first coefficient of thermal expansion is higher than the second coefficient of thermal expansion. According to some implementations, the outer surface of the first component can be substantially flush with the outer surface of the fastener.

According to another embodiment, an apparatus includes a first component susceptible to cracking, a second component coupled to the first component, and a nano-tube mesh positioned between the first component and the second component.

In some implementations of this apparatus, the second component includes a first portion and a second portion. The first portion has a first coefficient of thermal expansion, and the second portion has a second coefficient of thermal expansion different than the first coefficient of thermal expansion. The first portion can be at least partially embedded within the second portion, and the nano-tube mesh can entirely cover the first portion and at least partially cover the second portion.

According to some implementations of the apparatus, an outer periphery of the nano-tube mesh is larger than an outer periphery of at least one of the first and second components. An area of the nano-tube mesh can be larger than a cross-sectional area of at least one of the first and second components. The nano-tube mesh can provide a motion barrier between the first and second components. The nano-tube mesh can include nitrogen-doped carbon nano-tubes. Further, the nano-tube mesh can have a thickness between about 5 nm and about 500 nm.

According to yet another embodiment, an aircraft includes a frame, a cover coupled to the frame, a fastener that extends through the cover and into the frame to couple the cover to the frame, a nano-tube mesh positioned on the fastener and a portion of the cover proximate the fastener, and a coating applied onto the nano-tube mesh and cover. The coating can be a first coating made from a dielectric material, and the aircraft can further include a second coating applied onto the first coating. The second coating can be a paint material.

In another embodiment, a method for mitigating the formation of cracks in a first material includes applying a nano-tube mesh onto a second material, and applying the first material onto the nano-tube mesh and second material. In certain implementations, the method includes applying the nano-tube mesh onto a third material and entirely covering the third material with the nano-tube mesh, the third material being adjacent the second material. The third material has a coefficient of thermal expansion different than the second material.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
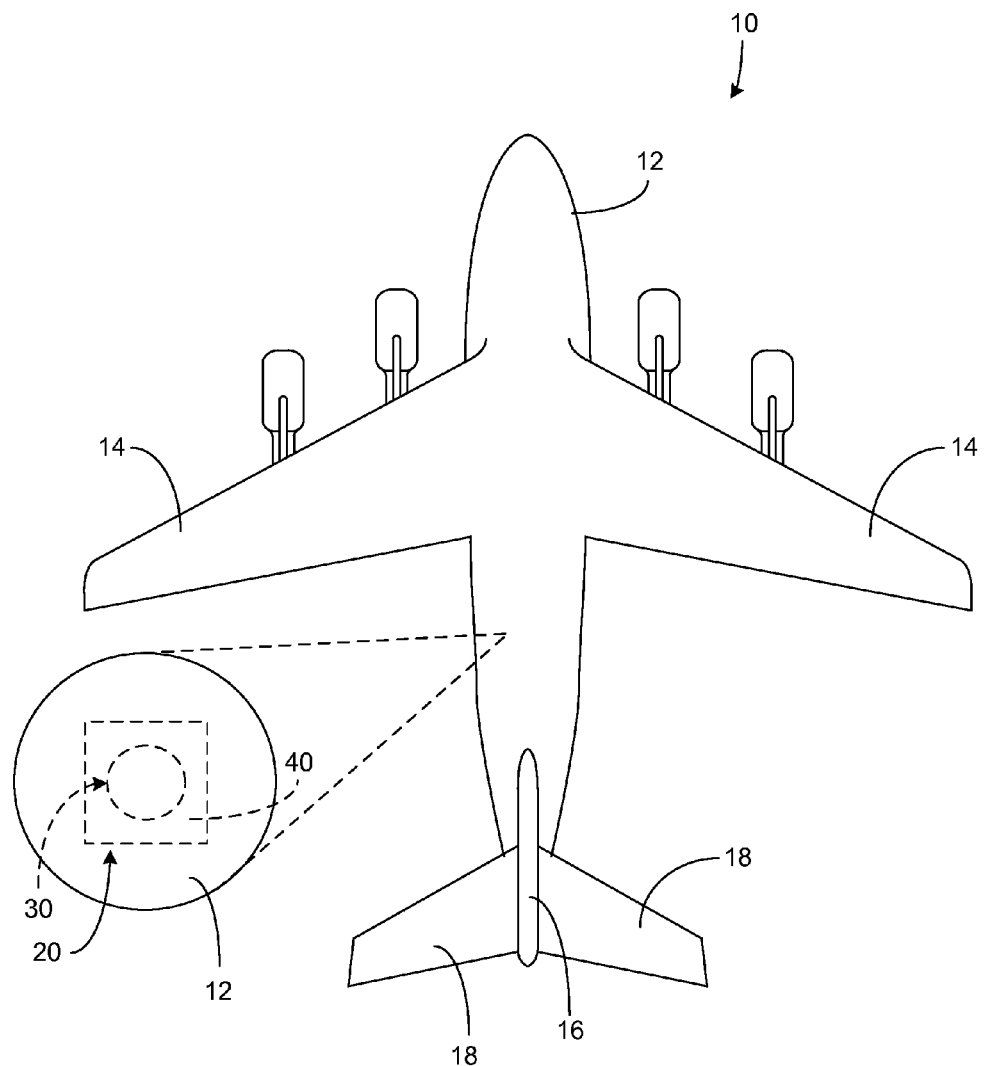
FIG. 1 is a top plan view of an aircraft showing a detailed section of the outer surface of the aircraft according to one embodiment.

Referring to FIG. 1, one embodiment of an aircraft 10 is shown. The aircraft 10 can be any of various commercial aircraft used for the transportation of passengers. The depicted aircraft 10 includes a body or fuselage 12, a pair of wings 14 coupled to and extending from the body 12, a vertical stabilizer 16 coupled to the body, and a pair of horizontal stabilizers 18 coupled to the body and/or the vertical stabilizer. The aircraft 10 can be any of various types of aircraft, such as a passenger airplane, a fighter jet, a helicopter, spacecraft, and the like. As depicted, the aircraft 10 represents a passenger airplane.

Generally, the body 12, wings 14, vertical stabilizer 16, and horizontal stabilizers 18 of the aircraft each includes an internal frame enveloped by a cover or skin. The cover is coupled to the frame to form an exterior shell of the aircraft. Most commonly, the cover is coupled to the frame using a plurality of fasteners that extend through the cover and engage the frame. For sealing, insulation, electrical conduction, and/or aesthetic effects, one or more additional components can be coupled to an exterior of the cover. For example, one or more coatings can be applied onto the cover. The coatings can include one or more of a sealant coating made from any of various materials, such as an insulation material, dielectric material, a paint coating, a conductive material coating, or a coating embedded with structural components, such as a conductive mesh or layer.

The aircraft 10 may include tens of thousands of fasteners, which, along with the materials forming the exterior shell, may be susceptible to corrosion due to environmental effects. Accordingly, the coatings applied onto the cover generally conceal and preserve the fasteners and exterior shell of the aircraft 10. One of a plurality of fasteners 30 of the aircraft 10 concealed by at least one coating is shown with hidden lines in FIG. 1. The fastener 30 is positioned on the body 12 of the aircraft 10 to couple the cover of the body to the frame of the body. Although only one fastener 30 on the body 12 is depicted, as discussed above, other fasteners of the aircraft 10 on the body, or other portions of the aircraft (e.g., wings 14, vertical stabilizer 16, and horizontal stabilizers 18), may be similarly represented.

Figure 2:
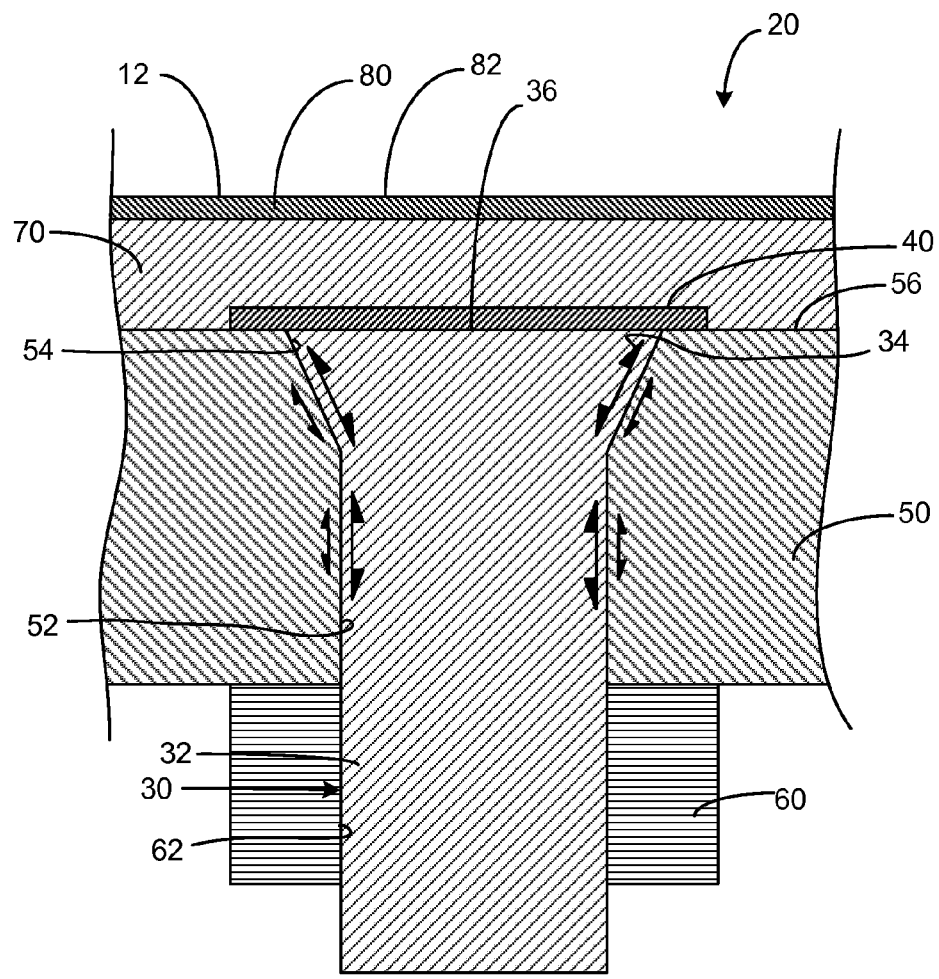
FIG. 2 is a cross-sectional side view of the body of an aircraft according to one embodiment.

Referring to FIG. 2, according to one embodiment, the fastener 30 forms part of a fastener assembly 20 and is shown coupling a cover or shell 50 of the aircraft 10 to a frame 60 of the aircraft. The fastener 30 includes a shank 32 and a head 34 coupled to the shank. The cover 50 defines an aperture 52 extending through a thickness of the cover. The aperture 52 defines a counterbore 54 configured to receive the head 34 of the fastener 30. Further, the frame 60 defines an aperture 62 with engagement elements (e.g., internal threads) configured to engage corresponding engagement elements (e.g., external threads) formed in the shank 32 of the fastener. Generally, the cover 50 is secured to the frame 60 by extending the fastener 30 through the aperture 52 of the cover and engaging (e.g., threadably engaging) the engagement elements of the fastener with those of the frame. Although the fastener 30 includes a beveled or flat head and the counterbore 54 is correspondingly beveled, the fastener and counterbore may include other configurations known in the art. In certain implementations, when the fastener 30 is properly matingly engaged with the cover 50 and frame 60, an outer surface 36 of the head 34 is substantially flush with an outer surface 56 of the cover.

The fastener 30 can be any of various types of fasteners known in the art capable of facilitating the coupling of the cover 50 to the frame 60. In other words, although the fastener 30 is shown with a common head and shank configuration, the fastener may have other configurations, shapes, and design characteristics. The fastener 30 is made from any of various materials having any of various coefficients of thermal expansion (CTE). In certain applications, such as aircraft applications, the fastener 30 is made from a metal material, such as steel, a steel alloy, aluminum alloys, titanium, and the like. Generally, the CTE of metal materials is relatively high compared to other materials, such as composite fiber materials. According to certain implementations, the fastener 30 is made from a metal material with a linear CTE between about $8.6 \times 10^{-6}/°$ C. and about $13 \times 10^{-6}/°$ C. at 20° C.

The cover 50 can be made from any of various materials having any of various CTE. In one embodiment, the cover 50 is made from a composite fiber material or fiber-reinforced polymer. The composite fiber material includes a polymer matrix with reinforced fibers, such as carbon-based fibers, glass-based fibers, and the like. Generally, the CTE of composite fiber materials is relatively low compared to metal materials, which results in less expansion and contraction during temperature fluctuations than metal materials. According to certain implementations, the cover 50 is made from a composite fiber material with a linear CTE between about $-1 \times 10^{-6}/°$ C. and about $1 \times 10^{-6}/°$ C. at 20° C. The cover 50 may have any of various thicknesses. Although the fastener 30 is described as having a higher CTE than the cover 50 in the illustrated embodiment, in other embodiments, the fastener 30 may have a lower CTE than the cover to create the CTE difference described herein.

Generally, the frame 60 is any of various internal frame sub-components, such as longerons (e.g., stiffener), bulkheads, and formers. The frame 60 can be made from any of various materials, such as metal, composite fiber, and the like. As broadly defined, the frame 60 can also represent coupling components, such as fixtures, fasteners (e.g., bolts), brackets, and the like, coupled directly or indirectly to the sub-components of the frame.

Referring again to FIG. 2, the aircraft 10 includes a dielectric coating or layer 70 applied onto the outer surface 56 of the cover 50. The dielectric layer 70 includes a desired thickness of a dielectric or electrically insulating material applied onto the cover 50 using any of various application techniques. The dielectric material can be any of various dielectric materials known in the art, such as synthetic or natural polymers (e.g., polyethylene, polypropylene, polystyrene, polytetrafluoroethylene, polyvinyl chloride, polymethyl methacrylate, polyamide, and polyimide), polycarbonates, elastomers, and the like. Although the dielectric layer 70 may have any of various thicknesses, in some embodiments, the thickness of the dielectric layer is between about 0.002 inches and about 0.003 inches. In some implementations, certain portions of the dielectric layer 70 may include an embedded conductive material, such as a metallic mesh.

The aircraft 10 may also include a paint coating or layer 80 applied onto the dielectric layer 70 such that the dielectric layer is positioned between the cover 50 and the paint layer. The paint layer 80 includes a desired thickness of a paint material, sealant material, or a material made from a paint-sealant combination applied onto the dielectric layer 70 using any of various techniques. Although the paint layer 80 may have any of various thicknesses, in some embodiments, the thickness of the paint layer is between about 0.002 inches and about 0.005 inches. In some implementations, additional coatings or layers may be applied onto the paint layer 80, or alternatively, the paint layer may include multiple sub-layers.

As described above, in the illustrated embodiment, the fastener 30 is made from a material with a CTE that is higher than the CTE of the material of the cover 50. Accordingly, the fastener 30 expands and contracts (e.g., linearly and/or volumetrically) differently than the cover 50 during the same temperature fluctuations. More specifically, as the fastener 30 and cover 50 expand with an increase in temperature, the fastener expands faster or more (represented by a larger arrow) than the expansion of the cover (represented by a smaller arrow). Similarly, as the fastener 30 and cover 50 contract with a decrease in temperature, the fastener contracts faster or more (represented by a larger arrow) than the contraction of the cover (represented by a smaller arrow). The CTE difference, and the associated difference in the speed and volume of the expansion and contraction of the fastener 30 and cover 50 results in relative motion or movement between the fastener and cover.

As described above, in certain implementations, the dielectric layer 70 is coated or applied onto the outer surfaces 36, 56 of the fastener 30 and cover 50, respectively. In other words, the dielectric layer 70 is fixed to the respective outer surfaces 36, 56 of the fastener 30 and cover 50. Accordingly, as the outer surfaces 36, 56 of the fastener 30 and cover 50 move or re-size via expansion and contraction of the fastener and cover, the dielectric layer 70 must conform to the repositioned or resized outer surfaces. Should the fastener 30 and cover 50 have the same or similar CTEs, expansion and contraction of the fastener and cover would be substantially synchronous, such that the respective portions of the dielectric layer 70 coated to the fastener and cover would be moved or re-sized (e.g., stretched or squished) at the same magnitude and/or rate. However, when the fastener 30 and cover 50 have dissimilar CTEs, such as in the illustrated embodiment, the substantially asynchronous expansion and contraction of the fastener and cover would result in the respective portions of the dielectric layer 70 coated to the fastener and cover to move or re-size at different magnitudes and/or rates. Repetitive relative expansion and contraction of the fastener 30 and cover 50, and the corresponding repetitive relative movement of the portions of the dielectric layer 70 at different magnitudes and/or rates tends to induce cracking in the dielectric layer at the boundary between the moving portions of the dielectric attached to the fastener and cover, respectively. For example, in the case of a fastener 30 with a circular head 34, the crack induced in the dielectric layer 70 would have a corresponding circular shape.

Figure 4:
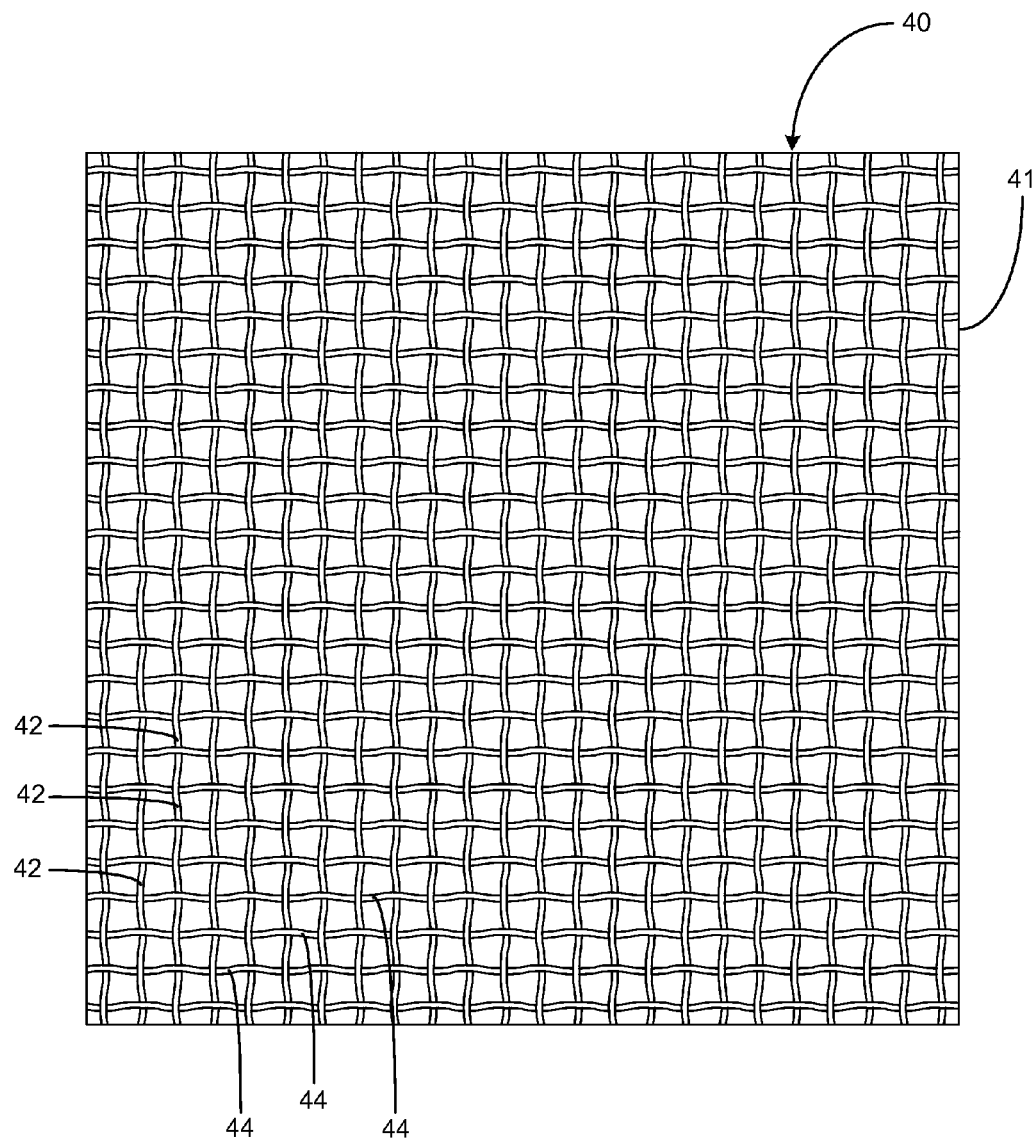
FIG. 4 is a top plan view of a sheet of nano-tube mesh according to one embodiment.

As shown in FIG. 2, crack formation in the dielectric layer 70 is mitigated with a nano-tube mesh 40 of the fastener assembly 20 positioned between the dielectric layer and the fastener 30, and between the dielectric layer and a portion of the cover 50 adjacent the fastener. Generally, the nano-tube mesh 40 of the fastener assembly 20 includes a plurality of nano-tubes arranged in a mesh or web pattern. For example, according to one embodiment shown in FIG. 4, the nano-tube mesh 40 includes a sheet 41 of interwoven nano-tubes 42, 44 (not shown to scale). Although not shown, the nano-tubes 42, 44 may be bound together by an adhesive, threading, or other technique at an outer periphery of the sheet 41 to contain the nano-tubes and maintain the shape and configuration of the sheet. Generally, each nano-tube 42, 44 has a cylindrical nanostructure with a relatively high length-to diameter ratio. In other words, the nano-tube mesh 40 can be fairly long and wide to cover macro-scale objects, such as fasteners, yet be thinner than nano-scale objects. The nano-tubes 42, 44 can be single-walled, double-walled, or multi-walled nano-tubes. Due to their unique properties, individual nano-tubes may naturally align themselves with other nano-tubes to form nano-tube ropes via pi-stacking or van der Waals forces. In certain implementations, each thread-like element represented as an individual nano-tube 42, 44 can actually be a nano-tube rope made from a plurality of individual nano-tubes.

According to some embodiments, the nano-tubes 42, 44 are carbon nano-tubes. The carbon nano-tubes may have a fullerene structure. For example each carbon nano-tube may a long, hollow structure with walls formed of one-atom-thick sheets of carbon or grapheme rolled into a cylindrical or tubular shape. The atoms forming the nano-tubes, particularly carbon nano-tubes, are chemically bonded together with so-called $sp^2$ bonds, which are extremely strong (e.g., tensile strength) compared to other types of chemical bonds. Accordingly, nano-tubes exhibit superior strength. Further, because nano-tubes are on the nano-scale in size, and because carbon is relatively lightweight in the case of carbon nano-tubes, the nano-tube mesh 40 is extremely strong, thin, and light. Additionally, each nano-tube is flexible such that nano-tube mesh also is flexible. Moreover, each nano-tube is not fixed relative to the other nano-tubes of the mesh 40. Accordingly, the individual nano-tubes 42, 44 may move relative to each other, but remain in an interwoven configuration. Further, carbon nano-tubes have a relatively low CTE, and can be considered semi-conductive.

In certain applications, each individual nano-tube 42, 44, or nano-tube rope, may be doped with an inert gas, such as nitrogen, argon, or boron to alter the properties of the nano-tube. According to some manufacturing techniques, doping the nano-tubes with an inert gas assists with the formation of the carbon sheets into a tubular configuration, and the formation of a plurality of nano-tubes into a nano-tube string. Nitrogen doping may also promote defects in the walls of the nano-tube so other materials can be embedded in the walls, which promotes better bonding of paint or dielectric materials.

At the outer surfaces 36, 56 of the fastener 30 and cover 50, the crack-initiating boundary is the intersection between the fastener and cover. Accordingly, in one embodiment, the nano-tube mesh 40 is large enough to at least cover, or be positioned over, the intersection between the fastener 30 and cover 50. In this manner, the nano-tube mesh 40 is positioned between the fastener and cover intersection and the dielectric layer 70. According to one implementation, the nano-tube mesh 40 has a substantially quadrangular shape (e.g., rectangular or square) with sides each longer than a diameter of the head 34 of the fastener 30, and with a center of the mesh being approximately aligned with a central axis of the head. However, in other embodiments, the nano-tube mesh 40 may have a shape other than quadrangular. For example, in one implementation, the nano-tube mesh 40 may have a circular shape with a diameter that is greater than the diameter (or major dimension in the case of a non-circular head) of the head 34 of the fastener 30. Alternatively, in one implementation, the nano-tube mesh 40 may have an annular shape with an inner diameter less than the diameter (or major dimension) of the head 34 of the fastener, and an outer diameter greater than the diameter (or major dimension) of the fastener head.

With the nano-tube mesh 40 positioned between the fastener and cover intersection and dielectric layer 70, the nano-tube mesh acts as a barrier between the intersection and dielectric layer. The unique properties of the nano-tube mesh effectively absorb the relative movement of the fastener 30 and cover 50 during expansion and contraction events such that the portion of the dielectric layer 70 over the intersection between the fastener and cover is less influenced by the relative movement. The absorption of relative movement is effectuated by the flexibility of the nano-tube mesh 40. Generally, as the fastener 30 and cover 50 move relative to each other, the portions of the nano-tubes 42, 44 of the mesh 40 in contact with the fastener and cover move or flex with the fastener and cover. However, the portions of the nano-tubes 42, 44 of the mesh 40 in contact with the dielectric layer 70 do not move or flex with the fastener and cover, but move or flex relative to the fastener and cover (and the other portions of the nano-tubes moving with the fastener and cover) and move or flex with the dielectric layer. In this manner, or because the individual nano-tubes 42, 44, or nano-tube threads, of the nano-tube mesh 40 can move relative to each other, the dielectric layer 70 does not experience the effects of the relative movement of the fastener 30 and cover 50 Because the effects of relative movement between the fastener 30 and cover 50 are reduced, the likelihood of crack formation in the dielectric layer 70 over the intersection between the fastener and cover also is reduced. In this manner, the nano-tube mesh 40 mitigates the formation of cracks in the dielectric layer 70.

In certain applications, such as automotive or aerospace, the dielectric layer 70 or paint layer 80 defines an exterior surface 82 of an object, such as an automobile or aircraft. Accordingly, for aesthetic and/or aerodynamic reasons, the exterior surface 82 of the dielectric layer 70 or paint layer 80 desirably is not bumpy or undulating. In the illustrated embodiment, to promote a non-bumpy or non-undulating exterior surface 82 as defined by the paint layer 80, particularly over the fastener 30, the outer surface 36 of the fastener desirably is flush with the outer surface 56 of the cover 50. In this manner, an even coating of dielectric material and paint applied onto the fastener and cover results in a smooth, non-bumpy, non-undulating exterior surface 82 of the paint layer 80. However, positioning a discrete, relatively thick, object between the fastener 30 and cover 50, and the dielectric and paint layers 70, 80 would result in a bump or undulation in the exterior surface 82 of the paint layer 80 if an even coat of dielectric material and paint is applied. To alleviate the appearance of such a bump or undulation, extra applications of dielectric material or paint can be applied, which would require extra time, labor, weight, and expense associated with the application of extra material. Alternatively, the bump or undulation can be physically removed, such as via sanding, and recoated with dielectric material or paint, which similarly introduces additional time, labor, and expense.

In the present embodiment, in addition to mitigating cracks, the extreme thinness of the nano-tube mesh 40 (e.g., the nano-tube mesh can have a thickness between about 5 nm and about 500 nm) mitigates bumps or undulations in the exterior surface 82, and correspondingly eliminates the need for additional time, labor, weight, and expense associated with reducing the appearance of or removing bumps or undulations in the exterior surface. In some implementations, the nano-tube mesh 40 has a thickness between about 17 μm and about 200 μm making any bumps or undulations formed in the exterior surface 82 by virtue of the nano-tube mesh 40 virtually undetectable.

Additionally, because the nano-tube mesh 40 has a lower weight-to-volume ratio than the dielectric layer 70 that the mesh effectively replaces, the overall weight of the body 12 and aircraft 10 is decreased with the use of the nano-tube mesh 40. Although the weight savings from a single nano-tube mesh 40 is quite small, the cumulative weight savings from tens of thousands of nano-tube meshes 40 can be substantial. Further, the nano-tube mesh 40, particularly when made from carbon nano-tubes, is stronger than the dielectric layer 70 it effectively replaces. Therefore, the overall strength of the body 12 and aircraft 10 is increased with the use of the nano-tube mesh 40. Similar to the weight savings, although the increased strength from a single nano-tube mesh 40 is quite small, the cumulative strength increase from tens of thousands of nano-tube meshes 40 can be substantial.

Figure 3:
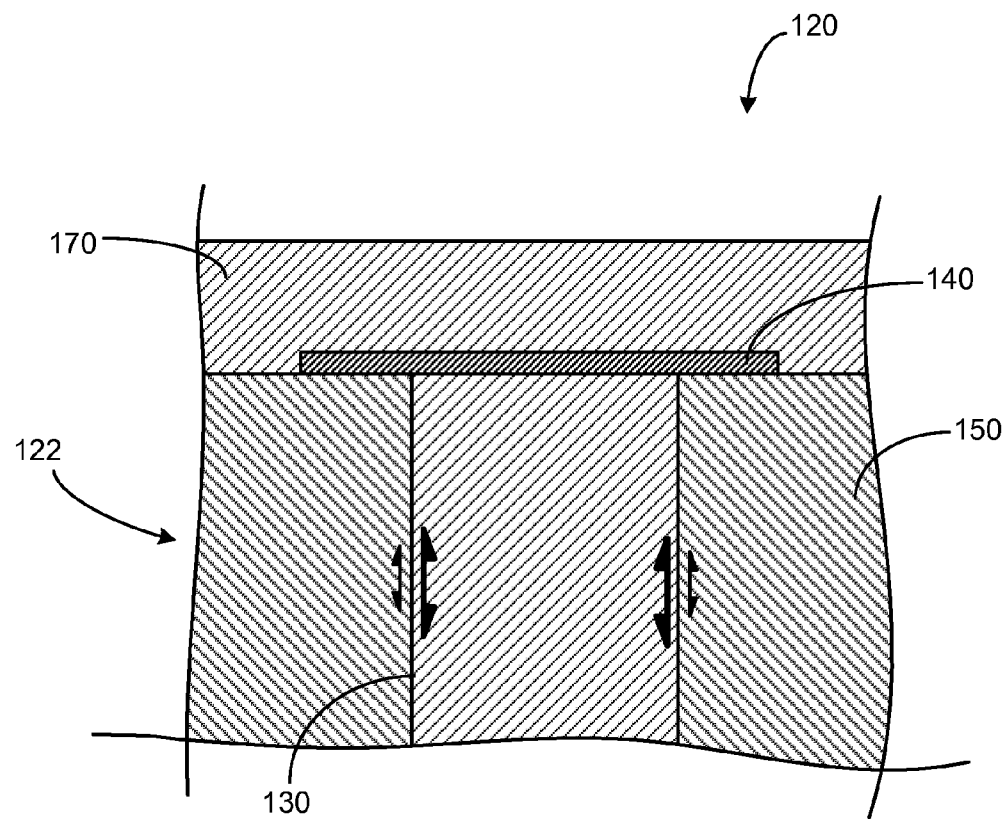
FIG. 3 is a cross-sectional side view of a component assembly according to one embodiment.

Although the illustrated embodiment associated with FIGS. 1 and 2 has been described in relation to an aircraft or aerospace application, in other embodiments, the features and advantages of the present application are equally application to any of various other objects and applications. For example, as shown in FIG. 3, an assembly 120, which can be an assembly for any of various objects, includes a first component 170 coupled to a second component 122. The first component 170 may be fixedly applied or coated onto the second component 122. The assembly 120 also includes a nano-tube mesh 140 positioned between the first component 170 and the second component 122. The first component 170 may be made from a material that is susceptible to cracking, such a dielectric or insulating material, or paint. The nano-tube mesh 140 may be a carbon nano-tube mesh made from carbon nano-tubes either undoped or doped with an inert gas, such as nitrogen.

The second component 122 of the assembly 120 may include two portions 130, 150 coupled together. A first portion 130 may be made from a material with a first CTE and the second portion 150 may be made from a material with a second CTE that is different (e.g., higher) than the first CTE. Accordingly, as shown with variably-sized respective directional arrows, the first portion 130 can expand and contract at different rates and magnitudes than the second portion 150. In the illustrated representation of FIG. 3, the directional arrows indicate that the first portion 130 expands and contracts faster or more than the second portion 150, which may have a lower CTE than the first portion. In one implementation, for example, the first portion 130 is made from a metal and the second portion 150 is made from a non-metal, such as a ceramic material or composite material. In other embodiments, the second portion 150 may have a higher CTE such that the second portion 150 expands and contracts faster or more than the first portion 130.

In certain implementations, the first portion 130 is embedded within the second portion 150. For example, like the fastener assembly 20, the first portion 130 can be a fastener extending through an aperture in the second portion 150.

Figure 5:
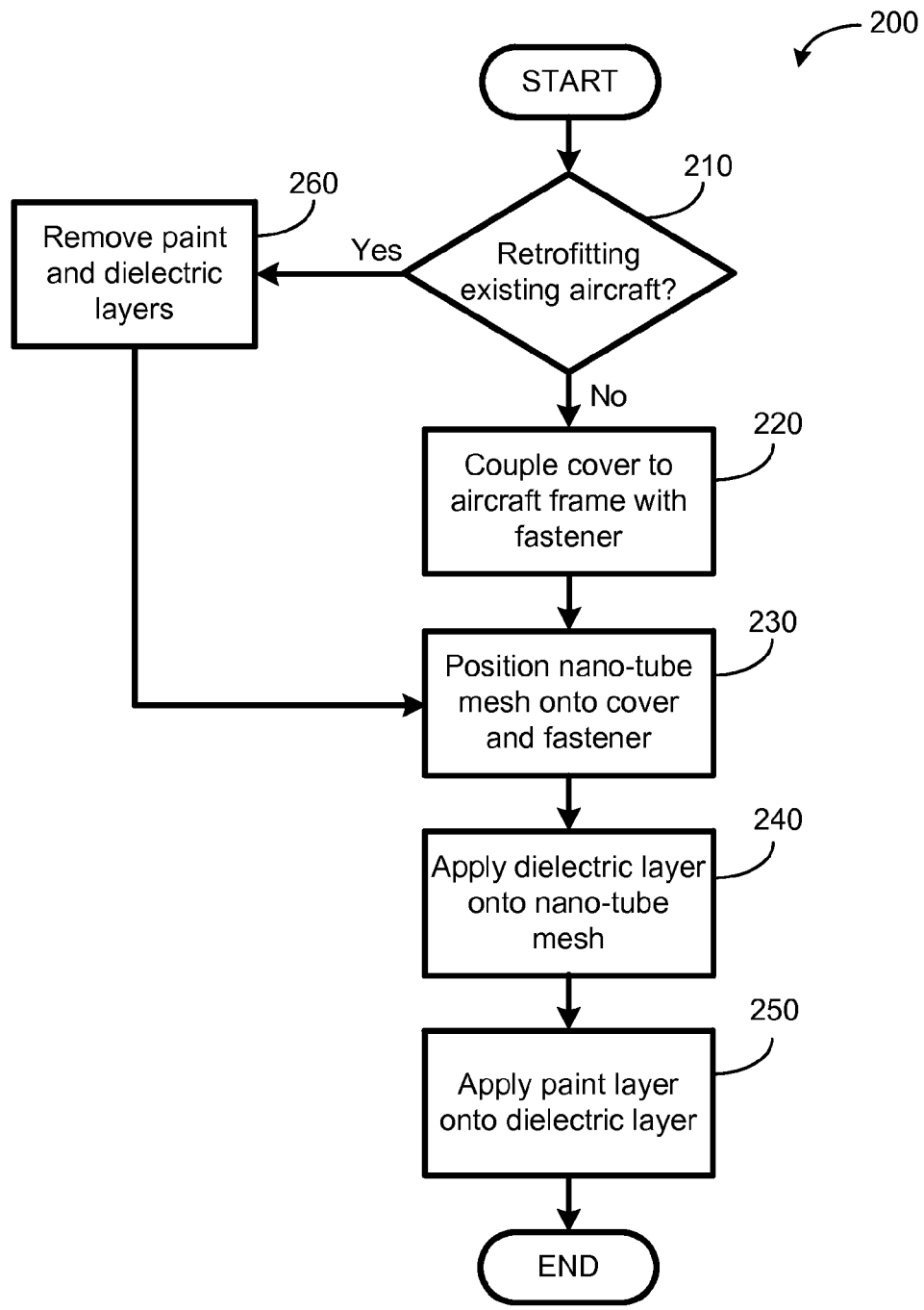
FIG. 5 is a schematic flow diagram of a method for mitigating the formation of cracks in a material.

Referring to FIG. 5, according to one embodiment, a method 200 for mitigating the formation of cracks in a first material includes determining whether an existing aircraft is being retrofitted at 210. If an existing aircraft is not being retrofitted (e.g., a new aircraft is being manufactured), the method 200 proceeds to couple a cover to the frame of the aircraft with a fastener at 220. In one implementation, the fastener couples the cover to the frame by being extended through an aperture in the cover and being tightened to the frame. After step 220, the method 200 includes positioning a nano-tube mesh (e.g., a carbon-doped nano-tube mesh) onto the cover and fastener at 230. In one implementation, the nano-tube mesh is positioned onto the cover and fastener by at least partially covering the cover (e.g., the portion of the cover just adjacent the fastener) with the nano-tube mesh and entirely covering the fastener with the nano-tube mesh. The method 200 then includes applying a dielectric layer onto the nano-tube mesh, which can include applying the dielectric layer onto the entire dielectric layer and at least the portion of the cover surrounding the nano-tube mesh. In some implementations, the dielectric layer is applied over nearly the entire aircraft. Then, the method 200 includes applying a paint layer onto the dielectric layer. In some embodiments, paint is applied onto at least the portion of the dielectric layer over the nano-tube mesh, and in some cases, the portion of the dielectric layer surrounding the nano-tube mesh. Although not shown, other coatings can be applied onto the paint layer.

If an existing or previously manufactured aircraft is being retrofitted at 210, the method 200 proceeds to remove at least a portion of the paint and dielectric layers on the aircraft at 260. In one implementation, the step 260 includes removing the portion of the paint and dielectric layers over a fastener or multiple fasteners to expose the fastener(s) and the cover surrounding (e.g., immediately surrounding) the fastener(s), leaving the paint and dielectric layers over other portions of the aircraft intact. The paint and dielectric layers can be removed using any of various techniques, such as sanding, dissolving, and the like. After the paint and dielectric layers are removed to expose the fastener at 260, the method 200 proceeds to position the nano-tube mesh onto the exposed fastener and the portion of the cover surrounding the fastener at 230, following which the subsequent steps 240, 250 of the method as described above are performed.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a first component having a first coefficient of thermal expansion;
   a fastener extending at least partially through the first component, the fastener having a second coefficient of thermal expansion different than the first coefficient of thermal expansion;
   a nano-tube mesh coupled to outer surfaces of the first component and fastener; and
   a second component applied to the nano-tube mesh and outer surface of the first component.

2. The apparatus of claim 1, wherein the nano-tube mesh comprises carbon nano-tubes.

3. The apparatus of claim 1, wherein the nano-tube mesh comprises nitrogen-doped carbon nano-tubes.

4. The apparatus of claim 1, wherein the first component is made from a composite fiber material.

5. The apparatus of claim 4, wherein the fastener is made from a metal material.

6. The apparatus of claim 5, wherein the second component is made from an electrically insulating material.

7. The apparatus of claim 5, wherein the second component is made from at least one of a dielectric material or a paint material.

8. The apparatus of claim 7, wherein the second component is made from a dielectric material, the apparatus further comprising a third component applied to the second component, the third component being made from a paint material.

9. The apparatus of claim 1, wherein the first coefficient of thermal expansion is higher than the second coefficient of thermal expansion.

10. The apparatus of claim 1, wherein the outer surface of the first component is substantially flush with the outer surface of the fastener.

11. An apparatus, comprising:
    a first component;
    a fastener extending at least partially through the first component;
    a nano-tube mesh positioned on the fastener and a portion of the first component proximate the fastener; and
    a second component applied onto the nano-tube mesh and the first component.

12. The apparatus of claim 11, wherein the first component has a first coefficient of thermal expansion, and the fastener has a second coefficient of thermal expansion different than the first coefficient of thermal expansion.

13. The apparatus of claim 12, wherein the fastener is at least partially embedded within the first component, and wherein the nano-tube mesh entirely covers the fastener and at least partially covers the first component.

14. The apparatus of claim 11, wherein an outer periphery of the nano-tube mesh is larger than an outer periphery of at least one of the first component and fastener.

15. The apparatus of claim 11, wherein an area of the nano-tube mesh is larger than a cross-sectional area of at least one of the first component and fastener.

16. The apparatus of claim 11, wherein the nano-tube mesh provides a motion barrier between the second component and an intersection between the first component and fastener.

17. The apparatus of claim 11, wherein the nano-tube mesh comprises nitrogen-doped carbon nano-tubes.

18. The apparatus of claim 11, wherein the nano-tube mesh has a thickness between about 5 nm and about 500 nm.

19. The apparatus of claim 11, further comprising an aircraft that comprises a frame, wherein the first component comprises a cover coupled to the frame and the fastener extends through the cover and into the frame to couple the cover to the frame, and wherein the second component comprises at least one of a dielectric layer or paint layer applied to the cover.

20. An aircraft, comprising:
    a frame;
    a cover coupled to the frame;
    a fastener extending through the cover and into the frame to couple the cover to the frame;
    a nano-tube mesh positioned on the fastener and a portion of the cover proximate the fastener; and
    a coating applied onto the nano-tube mesh and cover.

21. The aircraft of claim 20, wherein the coating is a first coating made from a dielectric material, the aircraft further comprising a second coating applied onto the first coating, wherein the second coating comprises a paint material.

22. A method for mitigating the formation of cracks in a first material, comprising:
    positioning a nano-tube mesh onto a fastener and a second material, the fastener extending at least partially through the second material; and
    applying the first material onto the nano-tube mesh and second material.

23. The method of claim 22, wherein positioning the nano-tube mesh onto the fastener comprises entirely covering the fastener with the nano-tube mesh, the fastener being adjacent the second material, and wherein the fastener has a coefficient of thermal expansion different than the second material.

* * * * *